(12) United States Patent
Tomassoni

(10) Patent No.: US 7,118,320 B2
(45) Date of Patent: Oct. 10, 2006

(54) MULTIPLE COMPARTMENT WASTE COLLECTION CONTAINER

(75) Inventor: Gabe Tomassoni, Huntsville (CA)

(73) Assignee: Fanotech Enviro Inc., Ontario (CA)

( * ) Notice: Subject to any disclaimer, the term of this patent is extended or adjusted under 35 U.S.C. 154(b) by 161 days.

(21) Appl. No.: 10/804,414

(22) Filed: Mar. 19, 2004

(65) Prior Publication Data

US 2004/0184904 A1 Sep. 23, 2004

(30) Foreign Application Priority Data

Mar. 21, 2003 (CA) .................................. 2423034
Mar. 17, 2004 (CA) .................................. 2459883

(51) Int. Cl.
*B60P 1/10* (2006.01)
*B65F 3/00* (2006.01)
*B65F 1/04* (2006.01)

(52) U.S. Cl. ................... 414/517; 414/512; 414/525.3; 414/525.5; 414/525.53

(58) Field of Classification Search ........ 414/516–517, 414/520–521, 525.1–525.6, 512
See application file for complete search history.

(56) References Cited

U.S. PATENT DOCUMENTS

| | | | |
|---|---|---|---|
| 3,615,028 A | 10/1971 | Appleman | |
| 3,615,029 A | 10/1971 | Anderson | |
| 3,746,192 A | 7/1973 | Herpich | |
| 3,777,917 A | 12/1973 | Herpich | |
| 4,002,272 A * | 1/1977 | Crawford et al. ........... | 222/392 |
| 4,029,224 A | 6/1977 | Herpich | |
| 4,065,008 A | 12/1977 | Ratledge | |
| 4,067,470 A | 1/1978 | Felburn | |
| 4,113,125 A | 9/1978 | Schiller | |
| 4,143,760 A | 3/1979 | Hallstrom | |
| 4,184,587 A | 1/1980 | Hallstrom | |
| 4,242,953 A | 1/1981 | St. Gelais | |
| 4,460,307 A | 7/1984 | Durant | |
| 4,557,658 A * | 12/1985 | Lutz ........................... | 414/517 |
| 4,690,607 A | 9/1987 | Johnson | |
| 4,691,819 A | 9/1987 | Hallstrom | |
| 4,709,805 A | 12/1987 | Foster | |
| 5,035,563 A * | 7/1991 | Mezey ....................... | 414/409 |
| 5,074,737 A * | 12/1991 | Pellegrini et al. ........... | 414/406 |
| 5,088,595 A | 2/1992 | Hallstrom, Jr. | |
| 5,116,184 A * | 5/1992 | Pellegrini ................... | 414/406 |
| 5,123,801 A | 6/1992 | ODaniel | |
| 5,163,805 A * | 11/1992 | Mezey ....................... | 414/810 |
| 5,165,525 A | 11/1992 | Quaeck | |
| 5,222,590 A | 6/1993 | Quaeck | |
| 5,267,641 A | 12/1993 | Hallstrom, Jr. | |
| 5,316,430 A | 5/1994 | Horning | |
| 5,332,081 A * | 7/1994 | Quaeck ................... | 198/750.6 |
| 5,352,084 A * | 10/1994 | Hodgins ..................... | 414/517 |

(Continued)

FOREIGN PATENT DOCUMENTS

AU        9474430 A  *   3/1996

(Continued)

*Primary Examiner*—Kathy Matecki
*Assistant Examiner*—Charles Greenhut
(74) *Attorney, Agent, or Firm*—Conley Rose, P.C.

(57) ABSTRACT

The present invention relates to a refuse collection system for use in association with a transport vehicle. The system comprises a container having multiple internal compartments and a refuse-receiving trough divided into a plurality of trough-shaped receptacles, each communicating with an internal compartment. The system further comprises an actuation system which engages a packer to displace refuse from the trough to the container.

18 Claims, 15 Drawing Sheets

U.S. PATENT DOCUMENTS

| | | |
|---|---|---|
| RE35,156 E | 2/1996 | Hallstrom, Jr. |
| 5,547,067 A | 8/1996 | Foster |
| 5,599,071 A * | 2/1997 | Kann et al. ............... 298/23 R |
| 5,823,728 A * | 10/1998 | Veldman et al. ............ 414/510 |
| 5,885,049 A | 3/1999 | McNeilus |
| 5,934,445 A | 8/1999 | Foster |
| 5,957,267 A | 9/1999 | Quaeck |
| 6,013,585 A | 1/2000 | Foster |
| 6,234,739 B1 | 5/2001 | Smith |
| 6,435,802 B1 * | 8/2002 | Schreiber et al. ........... 414/517 |
| 6,585,106 B1 * | 7/2003 | Foster ..................... 198/750.4 |
| 6,655,894 B1 * | 12/2003 | Boivin ....................... 414/408 |
| 6,776,570 B1 * | 8/2004 | Thobe et al. ............ 414/525.2 |
| 2005/0118008 A1 * | 6/2005 | Gabe ....................... 414/525.1 |
| 2005/0220593 A1 * | 10/2005 | MacPherson .......... 414/525.52 |

FOREIGN PATENT DOCUMENTS

| | | |
|---|---|---|
| DE | 3537546 A1 * | 4/1987 |
| EP | 359083 A1 * | 3/1990 |

* cited by examiner

MULTIPLE COMPARTMENT WASTE COLLECTION CONTAINER

FIELD OF THE INVENTION

The present invention relates to a container for use in association with a transport vehicle, for collecting and transporting various types of waste.

BACKGROUND OF THE INVENTION

Rear loading refuse vehicles are well known and are widely employed to transport municipal waste, for example. Generally, such vehicles employ an internal compartment, integral with a tailgate assembly, into which waste is deposited. The waste is then transferred into a main storage compartment and is compressed to economize on space. The system is typically integral with a purpose-built vehicle, although it may also be independently mounted to a truck chassis. The systems as described in some patents, such as U.S. Pat. Nos. 3,746,192, 3,777,917 and 4,029,224 (each of Herpich et al.), and U.S. Pat. No. 6,234,739 (Smith et al.), have improved upon the efficiency and durability of packing mechanisms by altering the placement of the hydraulic cylinders that mobilize the packing blade. Other improvements to rear loading refuse vehicles include positioning of the packing blade to avoid obstruction of the refuse deposited in the hopper, as in U.S. Pat. No. 4,460,307 (Durant et al.) and improved safety features such as those disclosed in U.S. Pat. No. 4,065,008 (Ratledge).

With the advent of recycling of municipal waste, it has become important to separate the waste stream, for example into "dry" and "wet" waste.

It is thus known to separate the refuse storage area of the main compartment into multiple sub-compartments to hold different waste materials. For example, each of U.S. Pat. No. 4,242,953 (St. Gelais), U.S. Pat. No. 4,113,125 (Schiller) and U.S. Pat. No. 5,123,801 (O'Daniel) disclose refuse vehicles with more than one storage compartment, with the compartments being aligned side by side. St. Gelais' truck has two compartments, one of which is served by a scraper blade, the other of which is packed by a press panel or ram. Schiller's refuse collecting system contemplates a separate feed or loading shovel for each separate chamber. Finally, O'Daniel's vehicle employs multiple scraper blades that empty the multiple buckets that receive refuse.

Multiple compartments may also aligned so that one compartment is above the other. U.S. Pat. No. 5,885,049 (McNeilus et al.) depicts a multiple compartment refuse vehicle in which one compartment is above the second compartment. The hopper has a lower and upper portion each of which is served by a separate packing mechanism.

Vehicles that employ multiple compartments for storing refuse have some limitations. For example, the viability of such vehicles is contingent upon the waste collection programmes and methods of public authorities. Different jurisdictions may have different waste separation and collection regimes such that a multi-compartmented vehicle may be suitable for one jurisdiction but not for its neighbour. Furthermore, the use of a separate packing mechanism to compress refuse in each separate compartment presents numerous disadvantages. First, if there are multiple tailgates and packing mechanisms, it is necessary to employ multiple power sources and components to operate those mechanisms. This increases the mass of the vehicle and thus diminishes its fuel efficiency. It also causes imbalance, since the packing components are located behind the rear wheels of the vehicle. Furthermore, the addition of more packers necessitates more frequent maintenance and thus makes the vehicle more expensive to build and operate. Finally, the individual packing mechanisms have less compaction capacity when there are multiple compacting means. Multiple packers are less efficient and thus the vehicles have less compaction capacity than traditional refuse transporting vehicles, known as "single stream" vehicles. As a result, such vehicles haul less trash than single stream vehicles with vehicle bodies having identical volumes.

Finally, the provision of a separate storage compartment to hold "wet" waste leads to other requirements. For example, as the compostable waste is compacted, it loses its water, thus creating liquid waste. This waste frequently escapes the refuse vehicle and presents an environmental hazard.

Once a number of loads of refuse have been transferred from the waste collection sub-compartments into the waste storage sub-compartments, the waste storage sub-compartments must have waste ejected from them. This can be achieved using rams or reciprocating slat-type conveyors.

Reciprocating slat-type conveyors are also known in the art for discharging refuse from a garbage truck. This type of conveyor system provides a convenient method of discharging refuse (or other loads) rearwardly from a trailer or container without tilting the trailer or utilizing rams with hydraulic extensions. The system typically includes a plurality of moveable slats extending lengthwise at the base of the trash compartment. The slats are independently driven with three or more drive means in a forward and rearward direction such that at any given moment either all slats or every third slat is in movement. Thus, a relatively short reciprocating movement will displace over time the entire load out of the trailer in a stepwise movement. Examples of such conveyors are disclosed in U.S. Pat. No. 4,143,760 (Hallstrom), U.S. Pat. No. 4,184,587 (Hallstrom), U.S. Pat. No. 4,691,819 (Hallstrom), U.S. Pat. No. 4,709,805 (Foster) and U.S. Pat. No. 5,934,445 (Foster et al.).

When the loads transported by a vehicle contain a liquid component, liquid may seep onto conveyor slats, between conveyor slats onto the drive means and out of the trailer or vehicle onto the road. This is especially problematic when the load is refuse such that the liquid may be toxic and its escape from the trailer or vehicle contravenes environmental regulations. Various solutions have been proposed in response to the seepage of toxic liquids from the load. U.S. Pat. No. 6,013,585 (Foster et al.) describes a method for manufacturing conveyor slats that are chemical resistant and non-corrosive. Each of U.S. Pat. No. 5,165,525 (Quaeck), U.S. Pat. No. 5,267,641 (Hallstrom, Jr.) and U.S. Pat. No. 5,547,067 (Foster) disclose base members to which the conveyor slats are attached. The base members may be attached, configured or sealed in such a manner so as to prevent the leakage of liquid beneath them. U.S. Pat. No. 5,088,595 and RE35,156 each disclose a liquid receptacle that collects liquid. The liquid receptacle extends beneath a portion of each base member.

Reciprocating conveyors may be attached to frameless trailers, as described in U.S. Pat. No. 5,957,267 (Quaeck et al.). Frameless trailers minimize the total mass of the load by eliminating components of the conventional framework assembly that normally supports the load. One drawback associated with the use of a frameless trailer is the damage sustained by the piston rods, which are components of the drive means, when loads are dropped on the conveyor slats above the piston rods. U.S. Pat. No. 5,957,267 adds fixtures to the drive means assembly, which fixtures bear the loads that are dropped upon the conveyor slats.

A further limitation that has been identified in prior art reciprocating conveyors is the position of the drive means. When such reciprocating conveyors are not fitted with base members, liquid waste seeps onto the drive means located beneath the conveyor slats, thus hampering movement of the conveyor slats. In liquid impermeable conveyor systems, it is expensive and labour intensive to mount a drive means below the conveyor slats. This is because an extensive hose and tubing system is necessary to connect the hydraulic fluid supply that is frequently a component of such drive means to drive units such as pistons. Thus U.S. Pat. No. 5,222,590 (Quaeck) discloses a configuration in which the drive means is positioned outside of the container in which the load is transported.

There are a number of limitations associated with prior art reciprocating conveyors, including improved reciprocating conveyors adapted to transport loads having a liquid component. Adding seals to each base member increases the costs of manufacture. Using base members to prevent the leakage of liquid beneath them is undesirable because such base members are susceptible to damage from the impact that they sustain when loads are dropped upon them. Replacing such base members is more costly and time-consuming when they are sealed. Furthermore, changing the configuration of the slats when they have a complicated base member structure, whether or not such structure includes seals, is also costly and time-consuming. Moreover, such seals trap moisture amongst the base member structure, thus making it susceptible to damage from the freezing of such moisture in cold temperatures. Finally, previous means for preventing leakage through the conveyor could not be attached to the conveyors of more than one manufacturer, since the width of the conveyor slats varies depending on who manufactures them.

SUMMARY OF THE INVENTION

An object of the invention is to provide an improved waste transportation system that compacts different classes of refuse separately by using a single tailgate assembly and packing mechanism and stores the classes of waste in separate compartments.

A further object of the invention is to provide an improved rear loading refuse vehicle with an improved movable barrier shaped so as to maximize the volume of the waste storage area and having a telescopic extension configured so as to maximize the volume of the waste storage area and the force exerted by the telescopic extension.

A further object of the invention is to provide an improved rear loading refuse vehicle with multiple storage compartments in which at least one compartment includes a reciprocating conveyor for removal of waste from the compartment.

In one aspect, the refuse collection system of the present invention comprises a refuse storage compartment divided into multiple internal compartments for receiving separate waste streams and each of said internal compartments has an opening to receive refuse. The system also has a refuse-receiving trough with an opening into which a user may deposit refuse. The trough is divided internally by at least one generally vertical barrier into a plurality of adjacent trough-shaped receptacles each communicating with a corresponding internal compartment. The trough has a floor and a rear wall dividing the trough from the storage compartment and the rear wall has an upper edge at the openings of the internal compartments. The system also has a packer to displace refuse from the receptacles into the internal compartments. The packer has a unitary upper blade that substantially spans the width of said trough and a plurality of lower blades independently hinged to the upper blade. Each lower blade corresponds to a receptacle for scooping refuse from the receptacle upon rotation of said lower blade. Finally, the system has an actuation system with a plurality of actuators for independently rotating the lower blades to scoop refuse from the receptacle for elevation to the upper edge of said rear wall and at least one actuator for driving the upper blade and the lower blades in a reciprocating movement for packing said refuse into the storage compartment.

In a further aspect, the refuse collection system of the present invention comprises a refuse storage compartment divided into multiple internal compartments for receiving separate waste streams and each of said internal compartments has an opening to receive refuse. The system also has a refuse-receiving trough with an opening into which a user may deposit refuse. The trough is divided internally by at least one generally vertical barrier into a plurality of adjacent trough-shaped receptacles each communicating with a corresponding internal compartment. The trough has a floor and a rear wall dividing the trough from the storage compartment and the rear wall has an upper edge at the openings of the internal compartments. The system further has a packer for displacing refuse from the receptacles into the internal compartments and a tunnel-like internal compartment having a ceiling such that the height of the tunnel-like internal compartment is lower than the height of the at least one other internal compartment.

In a further aspect, the refuse collection system of the present invention comprises a refuse storage compartment divided into multiple internal compartments for receiving separate waste streams. Each of the internal compartments has an opening to receive refuse and the storage compartment includes a forward extension. The system also has a refuse-receiving trough with an opening into which a user may deposit refuse. The trough is divided internally by at least one generally vertical barrier into a plurality of adjacent trough-shaped receptacles each communicating with a corresponding internal compartment. The trough has a floor and a rear wall dividing the trough from the storage compartment and the rear wall has an upper edge at the openings of the internal compartments. The system further has a packer for displacing refuse from the receptacles into the internal compartments. The system also has movable barriers for displacing refuse from said internal compartments outside of said system and a rams attached to each movable barrier wherein each ram is at least partly housed within said forward extension.

BRIEF DESCRIPTION OF THE DRAWINGS

In drawings which illustrate by way of example only a preferred embodiment of the invention.

DETAILED DESCRIPTION OF THE PREFERRED EMBODIMENTS

Figure 1:
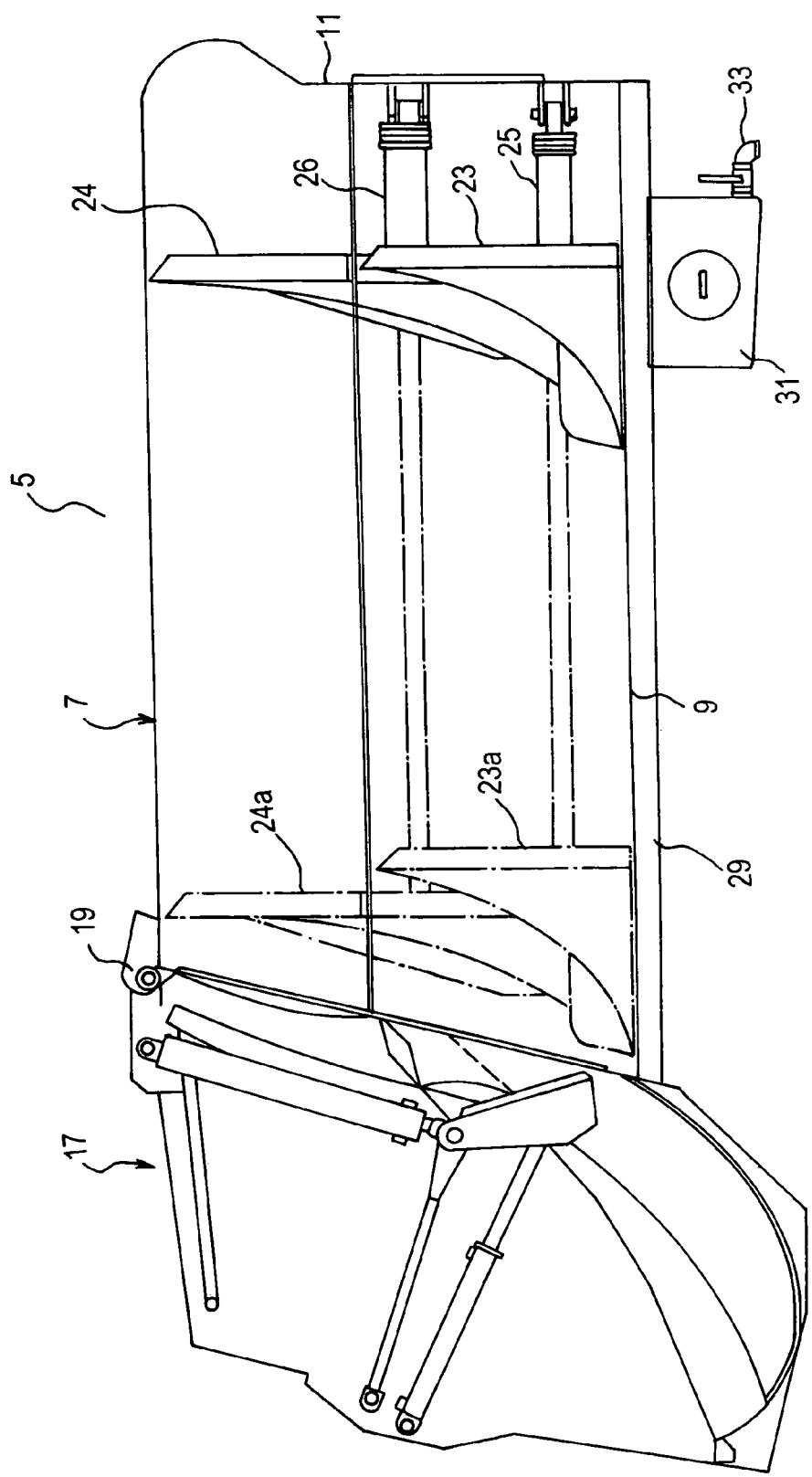
FIG. 1 is a side plan view of the waste collection container with the tailgate assembly in a closed position.
Figure 2:
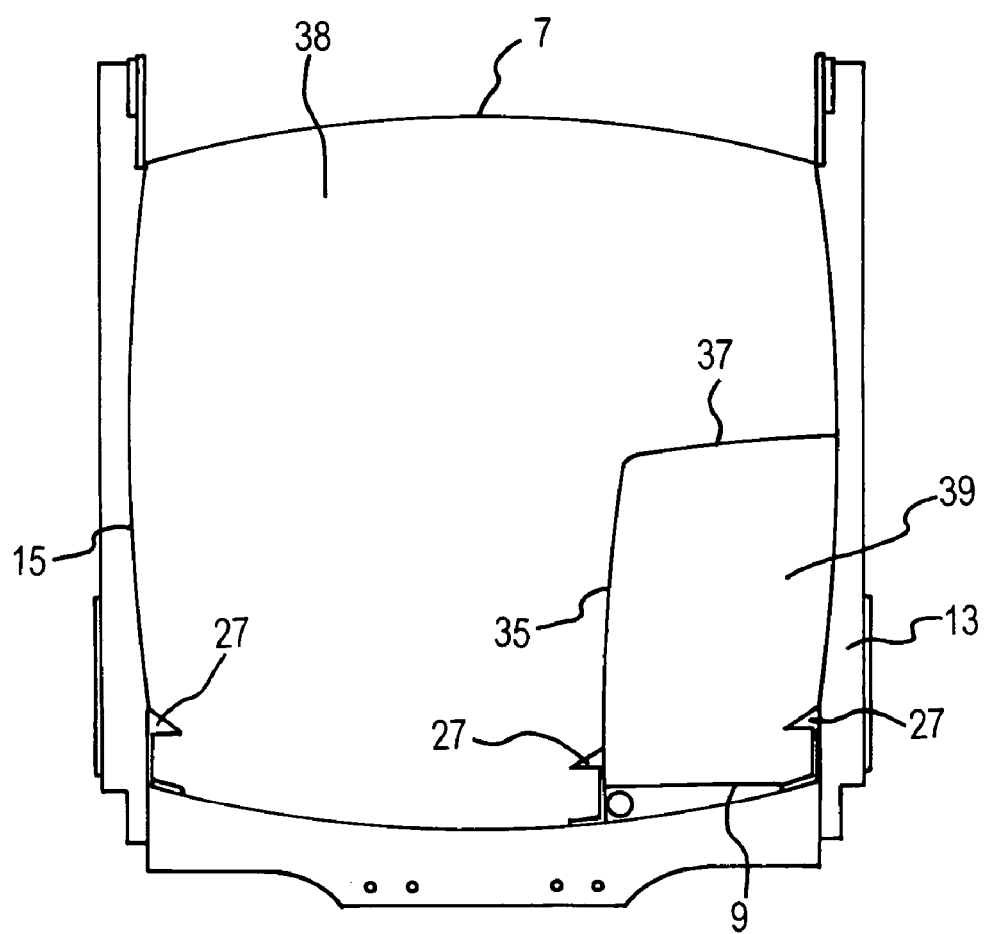
FIG. 2 is a rear view of the waste collection container from which the tailgate assembly has been detached.

A container 5 for collecting and transporting multiple types of waste is shown in FIGS. 1 and 2. Typical uses include handling of refuse and one or more recyclable waste products that have been placed at the curbside in separate containers. The container 5 is mounted on a chassis of a waste collection vehicle, as seen on FIGS. 8 and 9. The container 5 depicted has a top 7, a floor 9, a front wall 11 and side walls 13 and 15. The top 7 may be fully closed, open or openable, although a closed top is preferred. A tailgate assembly 17 is attached to the container 5 at a pivot attachment 19 and acts as a collection unit. Alternatively, a non-pivoting collection compartment may attach to the container 5. The interior of the container 5 is divided into two compartments for storing waste. It will be apparent that the container 5 may be divided internally into more than two internal compartments by providing suitable internal dividers.

Two movable barriers 23 and 24 for displacing refuse from container 5 are located within the container 5. The barriers 23 and 24 each comprise a plate that substantially spans an internal compartment. The barriers 23 and 24 are attached by rams 25 and 26 respectively to the front wall 11 of the container 5. The barriers 23 and 24 ride in tracks 27 which extend along the length of the container 5. The barriers 23 and 24 dispose of waste from separate compartments of the container 5, as will be described below.

The floor 9 beneath at least one of the compartments is perforated such that the compartment is in communication with a channel 29 located at the base of the container 5, to receive liquid waste that seeps from the stored waste. Channel 29 is also in communication with a sump 31. The sump 31 is attached to the container 5. A drain 33 is attached to the sump 31.

A first embodiment of the multiple compartments for storing waste is shown in FIG. 2. The container 5 is divided internally into two compartments for carrying separate waste streams. Each compartment has an opening to receive refuse. The compartments comprise a primary compartment 38 and a secondary compartment 39. The secondary compartment 39 is tunnel-like (i.e. it has a lower ceiling relative to the compartment 38) and extends generally the length of the container 5. The secondary compartment 39 is defined by a divider 35 attached to the floor 9 of the container 5 and a ceiling 37 attached to the divider 35 and the side wall 13. Thus, the secondary compartment 39 is defined by the floor 9, the divider 35, the ceiling 37 and the side wall 13. The secondary compartment 39 thus may be specially adapted to receive compostable waste. Specifically, the divider 35, the ceiling 37 and the side wall 13 are sealed so as to prevent moisture from the compostable waste from leaking from the tunnel. Furthermore the floor 9 is perforated.

The barrier 24 has a portion extending above the secondary compartment 39 and approaching the side wall 13.

The divider 35 and the ceiling 37 are preferably removably attachable to the floor 9 and the side wall 13 of the container 5. When the divider 25 and the ceiling 37 are removed, the container 5 is converted to a single undivided compartment.

Figure 3:
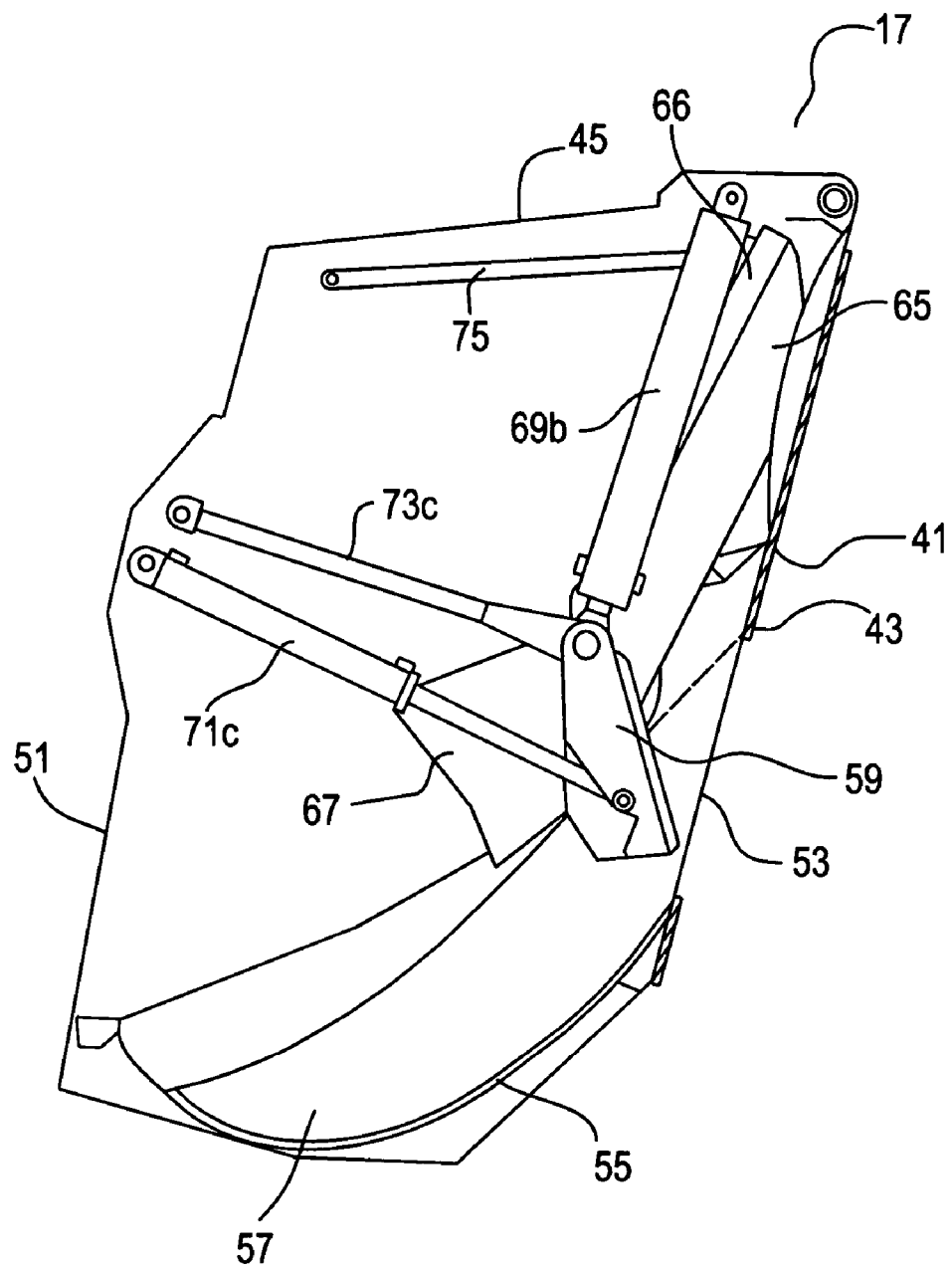
FIG. 3 is a side plan view of a detached tailgate assembly with a packing mechanism in a position above the refuse-receiving compartment.
Figure 4:
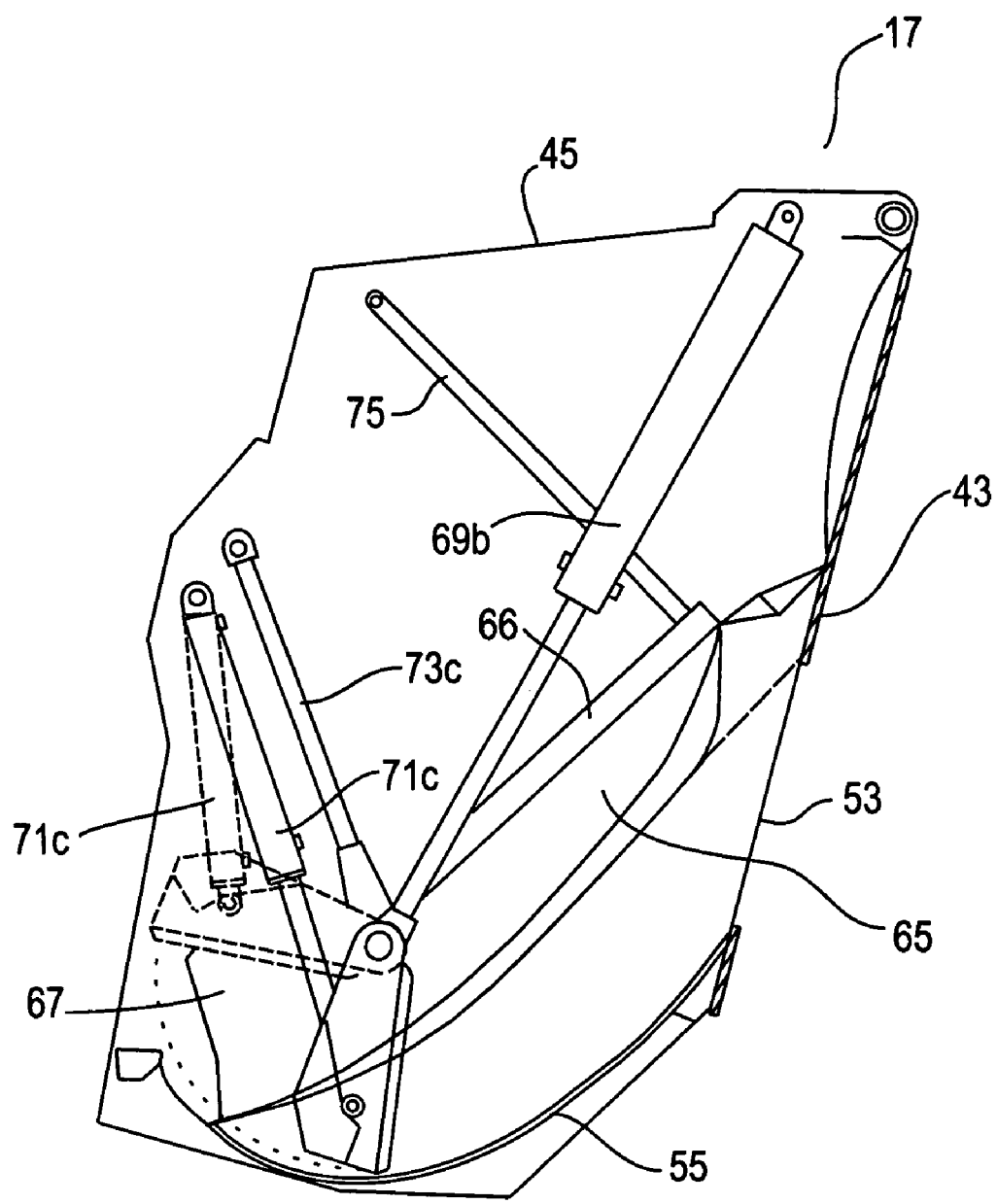
FIG. 4 is a side plan view of a detached tailgate assembly with the packing mechanism in positions above and within the refuse-receiving compartment.
Figure 5:
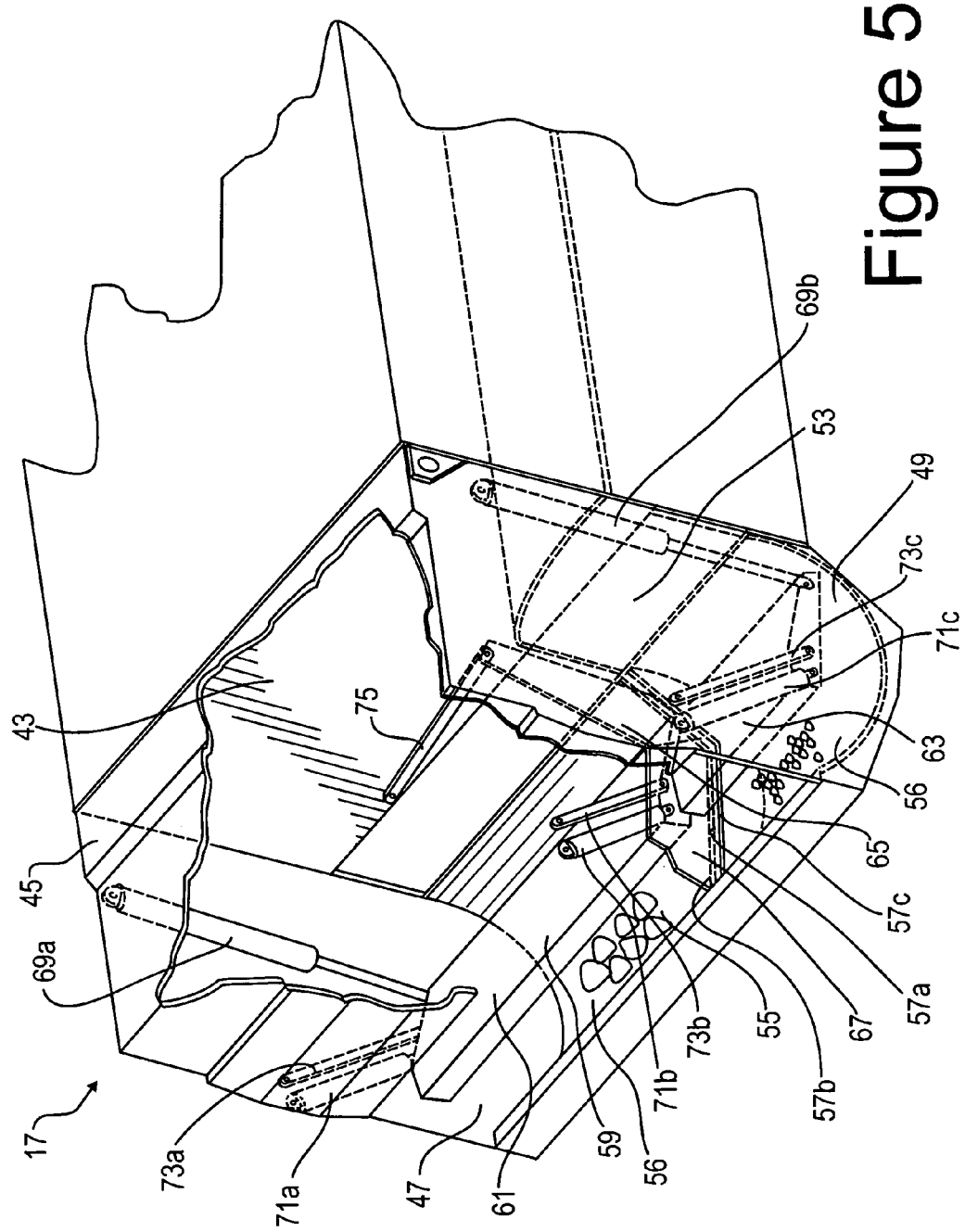
FIG. 5 is a perspective view of the tailgate assembly with the packing mechanism in a position above the refuse-receiving compartment.
Figure 6:
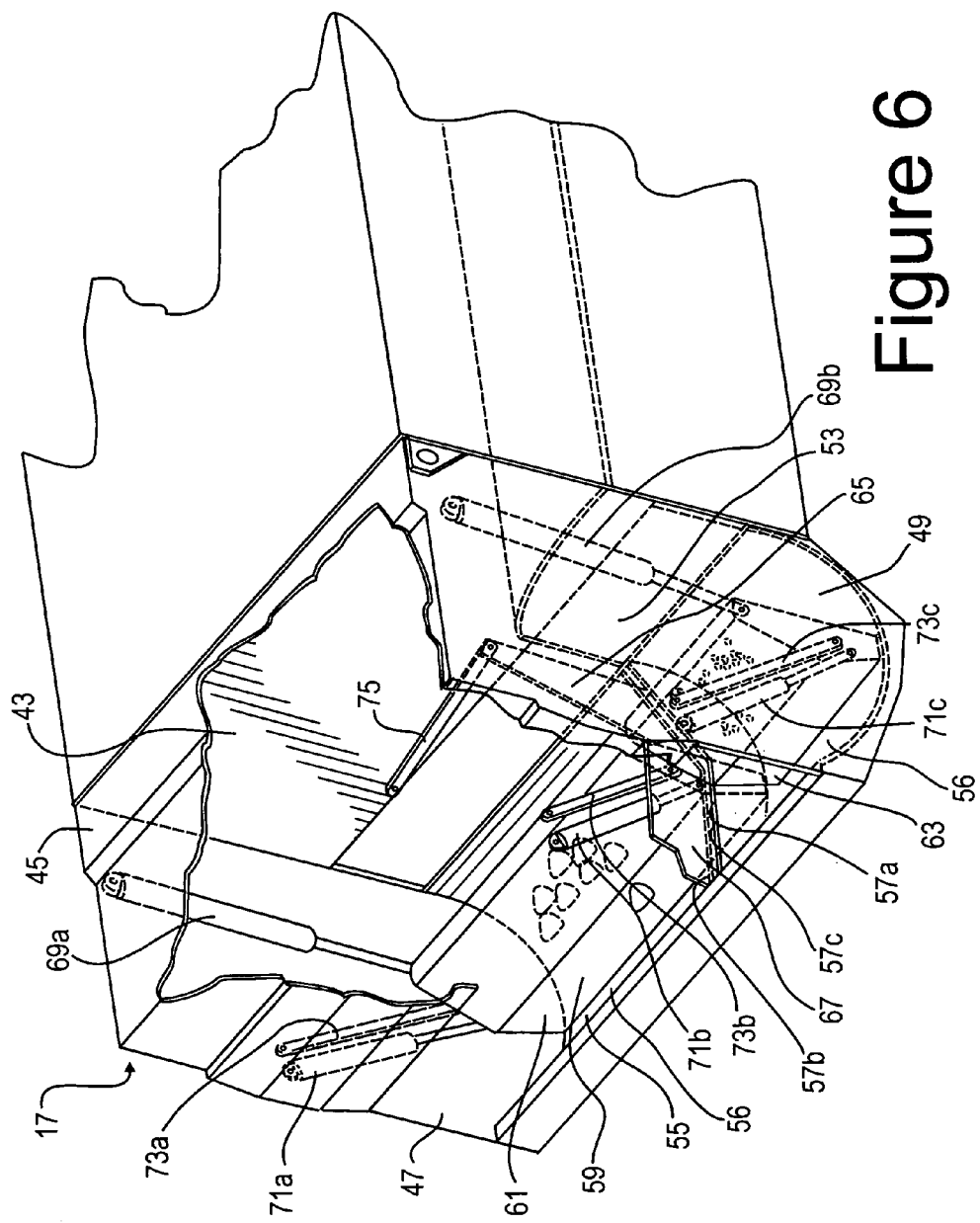
FIG. 6 is a perspective view of the tailgate assembly with the packing mechanism in a position within the refuse-receiving compartment.
Figure 7:
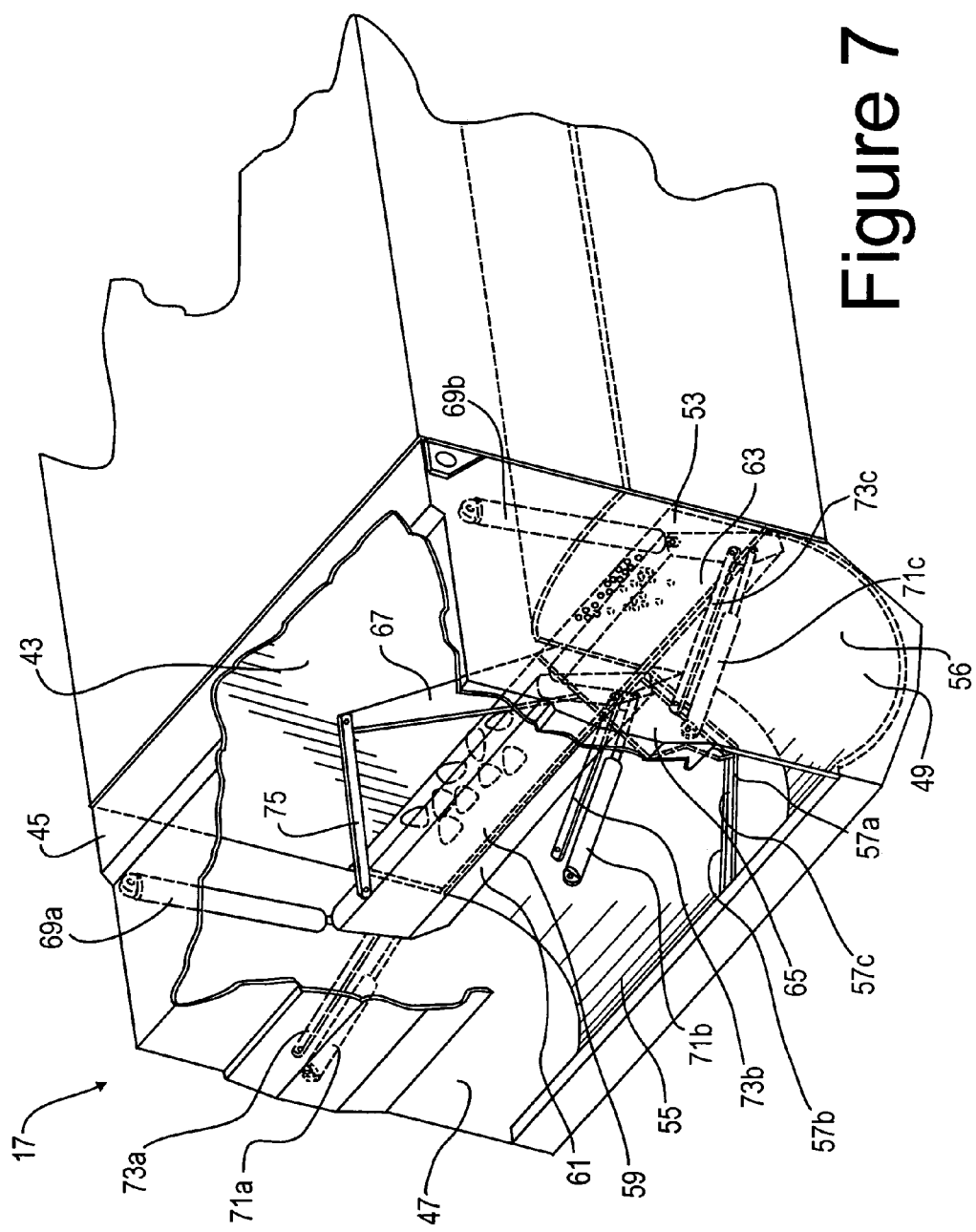
FIG. 7 is a perspective view of the tailgate assembly with the packing mechanism in a position to deliver refuse to the main collection container.

The tailgate assembly 17 has a front wall 43, a top 45, side walls 47 and 49 and a back wall 51, as shown in FIGS. 3 to 7. Front wall 43 has an opening 53. Attached to the front wall 43 of the tailgate assembly 17, and defining a floor of tailgate assembly 17, is a refuse-receiving trough 55. The front wall 43 has an upper edge at the opening 53. Preferably, the trough 55 is divided into two or more separate receptacles 56 by a generally vertical barrier 57. The vertical barrier comprises two spaced apart walls 57a and 57b which define an open-topped slot 57c between them. Although only two receptacles are depicted in FIGS. 5 to 7, it will be readily apparent that a greater number of receptacles may be provided. The number of receptacles should correspond to the number of compartments within the container 5 to receive refuse from a single receptacle 56 of the tailgate assembly 17.

A refuse packing mechanism or packer 59 is mounted within the tailgate assembly 17 for displacing refuse from the receptacles 56 into the compartments of the container 5. The packing mechanism 59 includes lower blades 61 and 63. It will be understood by one skilled in the art that more than two lower blades should be provided if there are more than two receptacles 56.

The packing mechanism 59 is also comprised of a movable divider 65. The movable divider 65 is flat and a fin 67 is attached to the movable divider 65. A portion of the movable divider 65 and the fin 67 fit within the slot 57c. The movable divider 65 moves within the slot 57c from a position proximate to and between the receptacles 56 to a position where the movable divider 65 is above the receptacles 56. The movable divider 56 fits within the slot 57c. The movable divider 65 and the fin 67 prevent refuse from spilling between receptacles 56 during transfer of refuse from the trough 55 to the container 5.

The packing mechanism 59 also has a unitary upper blade 66 which traverses the full width of the tailgate assembly 17. The upper blade 66 is not shown in FIGS. 5 to 7.

First hydraulic cylinders 69a and 69b are pivotably attached near the top of the packers 61 and 63. First hydraulic cylinders 69a and 69b also engage upper blade 66. At a second end, the first hydraulic cylinders 69a and 69b are pivotably attached to the tailgate assembly 17 near the top 43 of the tailgate assembly 17. More than two first hydraulic cylinders would add significantly to the mass of the tailgate assembly. Furthermore, adding further first hydraulic cylinders would necessitate a more complex system for engaging the first hydraulic cylinders. Finally, adding further first hydraulic cylinders would make it more difficult to achieve uniform movement of the packers 61 and 63. Second hydraulic cylinders 71a, 71b and 71c are pivotably attached near the base of the packers 61 and 63. A second end of each of the hydraulic cylinders 71a, 71b and 71c is pivotably attached to the tailgate assembly 17 near the back wall 49 of the tailgate assembly 17.

It will be understood that the packing mechanism 59 may be driven by any convenient type of actuators. While hydraulic rams, such as the rod and cylinder rams described herein, are convenient, other actuators may be employed with suitable system modifications.

Linkage arms 73a, 73b and 73c are pivotably attached at first ends to the tailgate assembly 17 near the back wall 51 of the tailgate assembly 17. Arms 73a, 73b and 73c are pivotably attached at second ends to lower blade 61 and arm 73c is pivotably attached at a second end to lower blade 63. A guide 75 pivotably attaches to the movable divider 65 at a first end of the guide 75. A second end of the guide 75 is pivotably attached near the intersection of the top 45 and the back wall 51 of the tailgate assembly 17.

When the container is in operation, waste that has been deposited into the refuse-receiving trough 55 and thus into the receptacles 56 is moved to the container 5 by the packing mechanism 59. The packing mechanism 59 has four primary positions through which it cycles within tailgate assembly 17. The positions of the lower blades 61 and 63 are controlled by the first hydraulic cylinders 69a and 69b and second hydraulic cylinders 71a, 71b and 71c. First hydraulic cylinders 69a and 69b govern the vertical position of the lower blades 61 and 63, while second hydraulic cylinders 71a, 71b and 71c rotate the lower blades 61 and 63. The vertical position of the movable divider 65, and thus the fin 67, corresponds with the vertical position of the lower blades 61 and 63 such that different types of refuse are kept separate during the cycle of the packing mechanism 59. The vertical position of the unitary upper blade 66 moves in concert with the vertical position of the lower blades 61 and 63 and holds the refuse in place as it approaches opening 53.

In the first position of the packing mechanism 59, shown in FIGS. 3 and 7, the lower blades 61 and 63 are positioned near the opening 53 in the front wall 43 of the tailgate assembly 17. The first hydraulic cylinders 69a and 69b are fully retracted and the second hydraulic cylinders 71a, 71b and 71c are fully extended. Preferably the packing mechanism 59 is in the first position when waste is added to the receptacles 56.

In the second position of the packing mechanism 59, the second hydraulic cylinders 71a, 71b and 71c are retracted so as to rotate the lower blades away from the front wall 43 of the tailgate assembly 17. This will provide some clearance between the packers 61 and 63 and refuse within the refuse-receiving trough 55 as the lower blades 61 and 63 are displaced by the extension of the first hydraulic cylinders 69a and 69b toward the refuse-receiving trough 55. If retraction of the second hydraulic cylinders 71a, 71b and 71c occurs when the first hydraulic cylinders 69a and 69b are not in a fully retracted position, waste may be forced from the waste-receiving trough 55 outside of the tailgate assembly 17 as the packing mechanism 59 moves toward the third position.

In each of the first and the second position of the packing mechanism 59, a portion of the moveable divider 65 and the fin 67 are orientated above the refuse-receiving trough 55. The unitary upper blade is also orientated above the refuse-receiving trough 55 proximate to the opening 53.

In the third position, shown in stippled lines in FIG. 4 and in FIG. 5, the packing mechanism 59 is positioned near the back wall 51 of the tailgate assembly 17 and is above the waste within the refuse-receiving trough 55. The first hydraulic cylinders 69a and 69b are fully extended, while the second hydraulic cylinders 71a, 71b and 71c are fully retracted. The movable divider 65 is above the refuse-receiving trough 55 and the fin 67 separates the receptacles 56.

In the fourth position of the packing mechanism 59, also shown in FIG. 4 and in FIG. 6, the lower blades 61 and 63 engage the refuse within the refuse-receiving trough 55. The packers 61 and 63 have rotated into the receptacles 56 as the second hydraulic cylinders 71a, 71b and 71c have extended. Retraction of the first hydraulic cylinders 69a and 69b return the lower blades 61 and 63 to the first position and the unitary upper blade 66 moves in concert with the lower blades 61 and 63 such that refuse does not spill from the tailgate assembly 17. Refuse is thus swept from the receptacles 56 toward the opening 53 in the front wall 43 of the tailgate assembly 17. The movable divider 65 and the fin 67 have moved in conjunction with the lower blades 61 and 63 and the unitary upper blade 66 to ensure the continued separation of refuse from receptacles 56. The refuse is ultimately deposited by the lower blades 61 and 63 through the opening 53 into the primary compartment 38 and the secondary compartment 39. The tunnel-like shape of secondary compartment 39 permits the corresponding receptacle 56 to have a width sufficient to permit the loading of refuse while maximizing the volume of the primary compartment 30.

Figure 8:
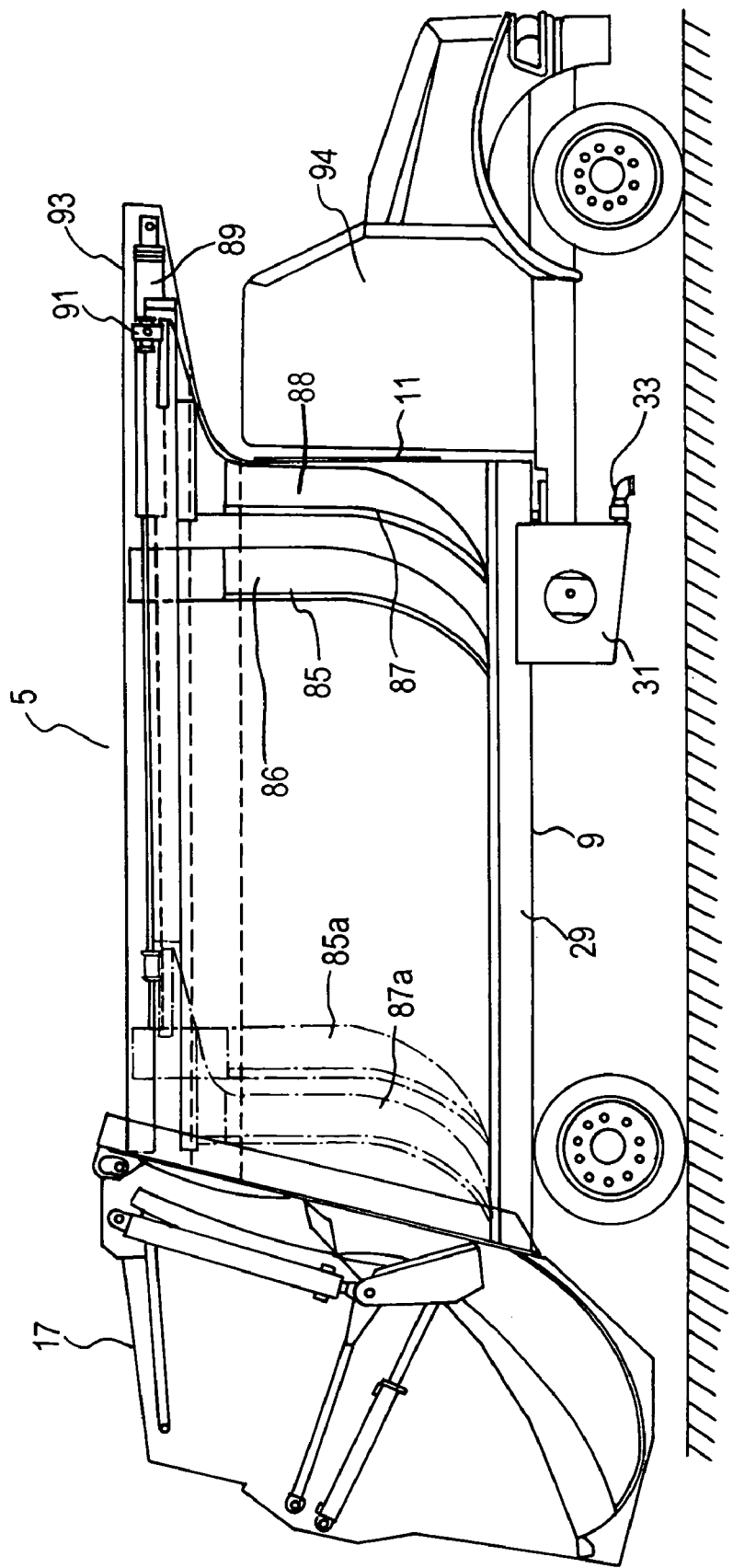
FIG. 8 is a side plan view of a further embodiment of the waste collection container attached to a vehicle in which the container has alternatively shaped dual rams and alternatively configured telescopic extensions.
Figure 9:
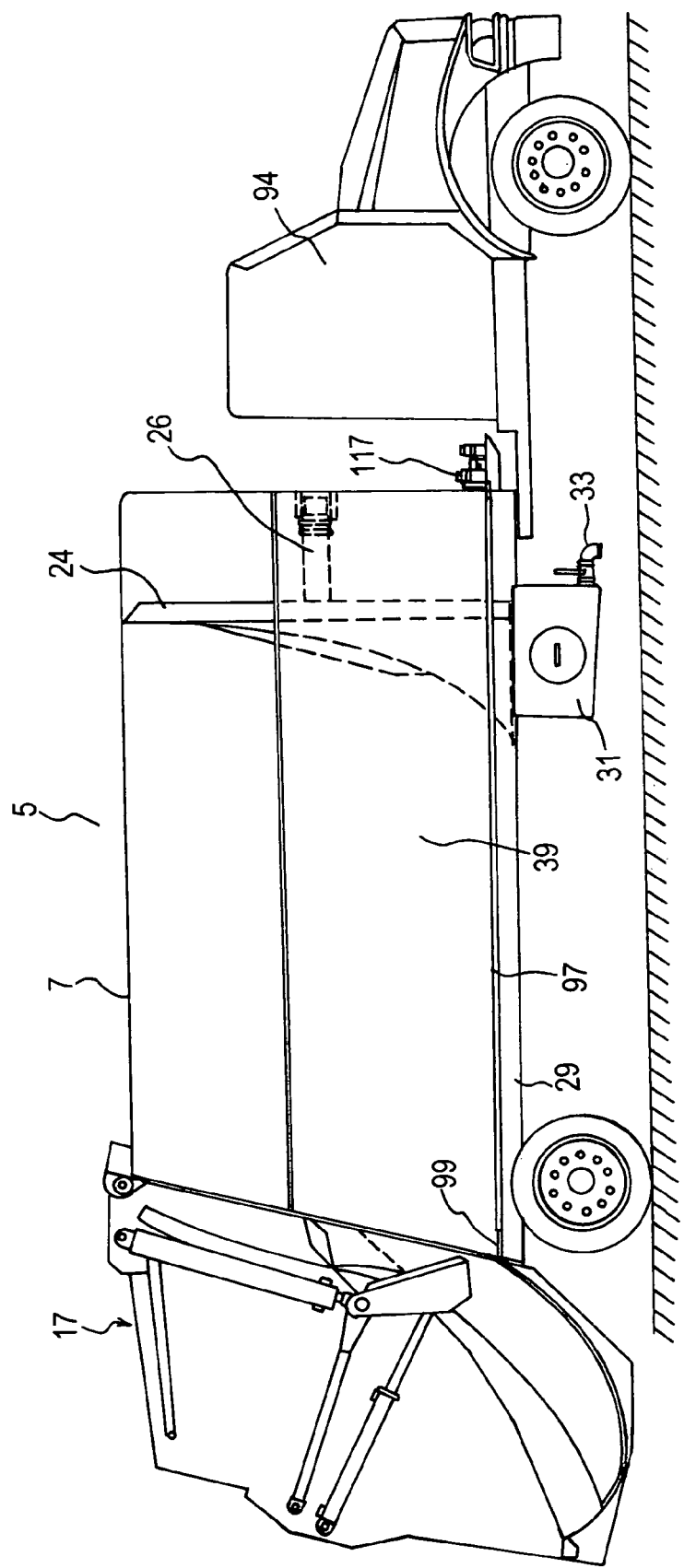
FIG. 9 is a side plan view of a further embodiment of the waste collection container with a single ram and a reciprocating conveyor.
Figure 10:
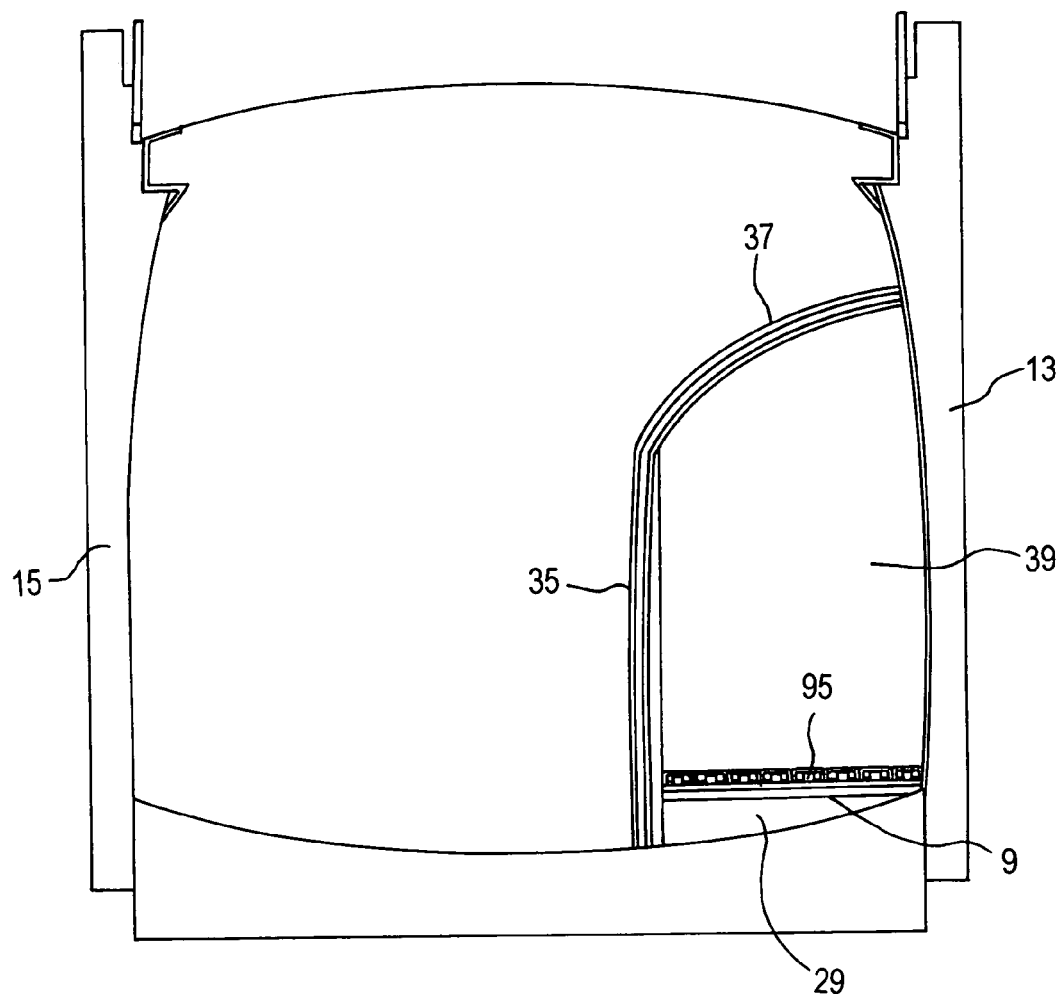
FIG. 10 is a rear plan view of the further embodiment of the waste collection container shown in FIG. 9.
Figure 11:
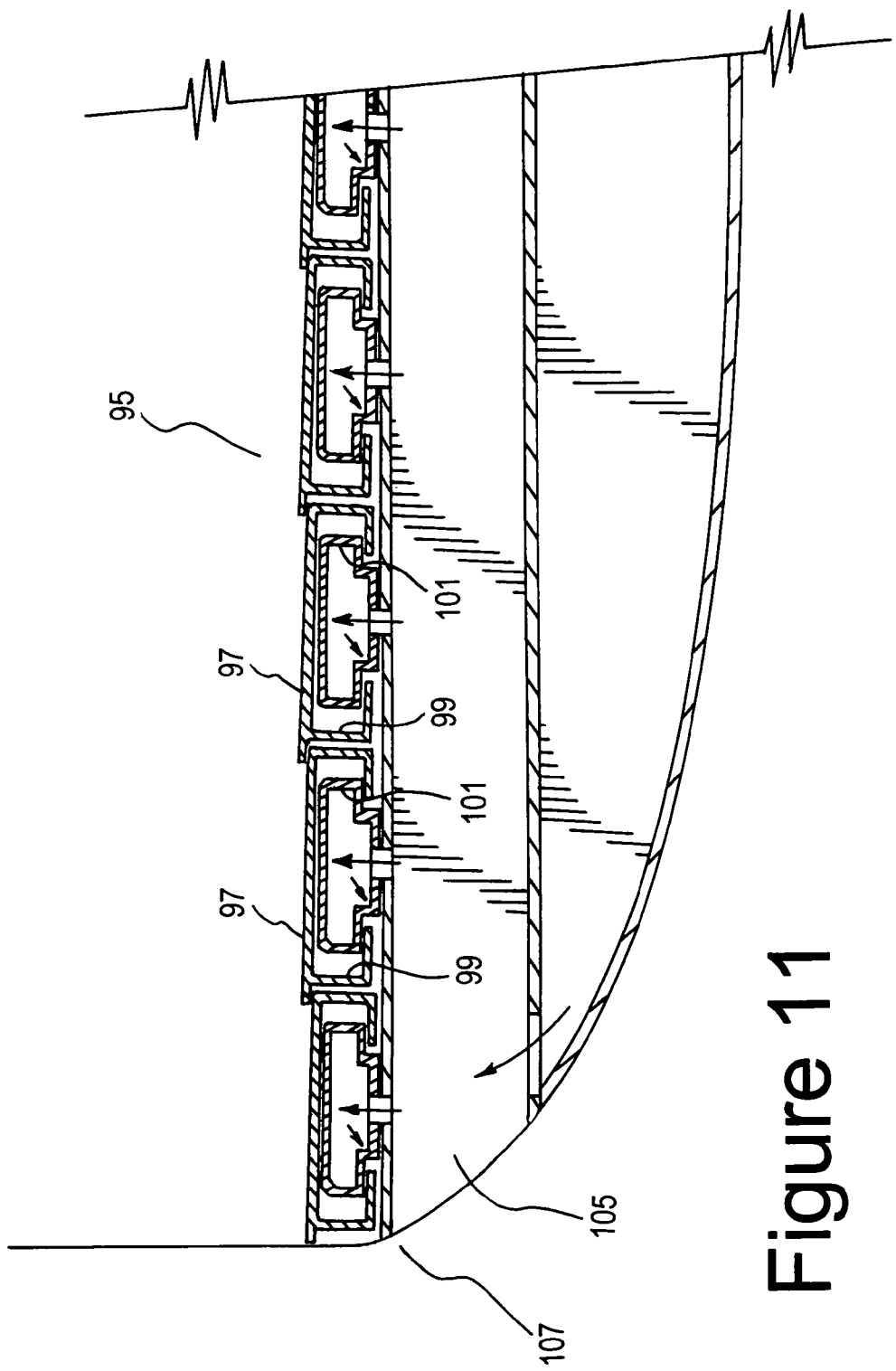
FIG. 11 is a rear plan view showing the configuration of slats and slat-bearing bars that comprise the moving conveyor.
Figure 12:
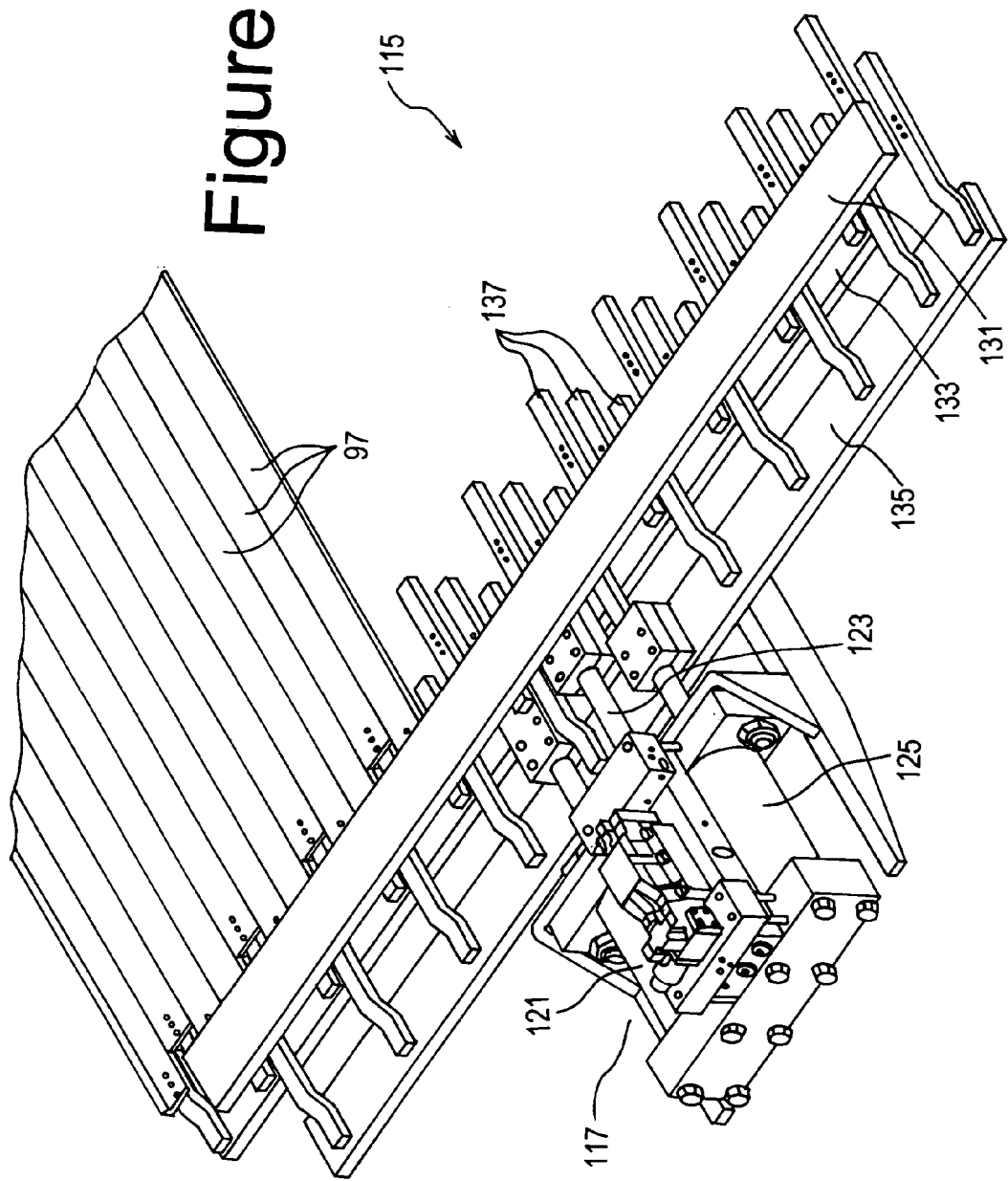
FIG. 12 is a perspective view of a drive means for moving the conveyor.

A further embodiment of the container 5 is shown in FIG. 8. This embodiment of the container 5 has J-shaped barriers 85 and 87, which occupy less volume in the compartments for storing waste than the barriers 23 and 24. The J-shaped barriers 85 and 87 have upper portions 86 and 88 respectively that are generally parallel to the front wall 11 and rearwardly curving lower portions to form a rearwardly facing scoop.

In this further embodiment of the container 5, the rams 25 and 26 have been replaced with overhead rams 89 and 91 such that the J-shaped barriers 85 and 87 are located proximate to front wall 11 when the overhead rams 89 and 91 are in a fully retracted position. Overhead rams 89 and 91 attach at one end to container 5 within a forward extension or overhang 93, which extends from the front wall 11 and protrudes forwardly, extending at least partly over a truck cab 94. Thus a more space-efficient mounting position is provided. At a second end, overhead rams 89 and 91 attach near the top of J-shaped barriers 85 and 87 respectively. In this embodiment of the container 5, wet refuse is stored in a compartment having a height similar to the height of a dry refuse compartment rather than in the secondary compartment 39.

After many cycles of the packing mechanism 59 through position one to position four within the tailgate assembly 17, it will be necessary to expel waste from the container 5. The tailgate assembly 17 may be opened and closed by hydraulic means. The tailgate assembly 17 pivots about the pivot attachment 19 upward and away from container 5 and may be locked in the open position.

When the container 5 is empty, the barriers 23 and 24 or alternatively the J-shaped barriers 85 and 87 are located at or near the front wall 11 of the container 5. In operation, the barriers 23 and 24 or the J-shaped barriers 85 and 87 move upon the tracks 27 in response to force exerted by the rams 25 and 26 or the overhead rams 89 and 91 to a position represented by the references 23a and 24a in FIGS. 1 and 85a and 87a in FIG. 8. The rams 25 and 26 or alternatively the overhead rams 89 and 91 may be engaged separately so as to expel waste from a single compartment of the container 5. The rams 25 and 26 or the overhead rams 89 and 91 preferably extend the barriers 23 and 24 or the J-shaped barriers 85 and 87 to a position of the container 5 proximate to the tailgate assembly 17 so that all refuse in the path of the barriers 23 and 24 or the J-shaped barriers 85 and 87 as defined by the tracks 27 is ejected from the container 5 so as to empty the container 5 at the waste deposit site. When container 5 is emptied of refuse material, the rams 25 and 26 or the overhead rams 89 and 91 are retracted, thus returning the barriers 23 and 24 or the J-shaped barriers 85 and 87 to their position near the front wall 11 of the container 5.

FIGS. 9 to 12 show a further embodiment of the container 5 in which the container floor comprises a reciprocating conveyor 95 to discharge waste from the container 5 at a dump site. Elongated slats 97 extend lengthwise within at least one compartment in the container 5 for reciprocal movement between a first position and a second position in the fore/aft direction within the container 5. Such movement advances refuse from the container 5.

Each slat 97 is engaged to a lengthwise member or slat-bearing bar 99. Each slat-bearing bar 99 has a bearing 101 clipped to the slat-bearing bar 99 and the slat 97 engages and slides upon the bearing 101. The elongated slats 97 are set upon the slat-bearing bars 99 such that there is a space between the adjacent slats 97. This space is wide enough for liquid to seep through. Preferably the space is about 1/32 of an inch but may have a width of between 1/64 of an inch and three inches. Preferably the space is of a size so as to prevent solid waste from falling between the slats 97.

The slat-bearing bars 99 are attached to at least two cross members 105 such that the slat-bearing bars 99 and the cross members 105 form a frame 107. The slat-bearing bars 99 are attached generally perpendicularly to the cross members 105. Preferably, the cross members 105 and the slat-bearing bars 99 are hollow.

The reciprocating conveyor 95 is powered by a drive means 115 for displacing the elongated slats 97 in the fore/aft direction. One component of the drive means 115 is a hydraulic drive 117. The hydraulic drive 117 is situated outside of the container 5 and out of the path of the liquid refuse falling between the elongated slats 97. The hydraulic press 117 delivers hydraulic fluid to three hydraulic rams 121, 123 and 125, each of which extend through an opening 127 in the front wall 11 into the container 5. Each of the hydraulic rams 121, 123 and 125 are attached to one of three transversely mounted drive bars 131, 133 and 135. Each of the drive bars 131, 133 and 135 have extending rearwardly therefrom an array of spaced-apart fingers 137. The fingers 137 of each drive bar are attached to the elongated slats 97 in a manner such that every third elongated slat 97 is attached by a finger 137 to the same drive bar. Preferably, fingers 137 are bolted to the elongated slats 97.

It will be understood by a person skilled in the art that the drive means 115 may have any number of hydraulic cylinders greater than one and that the number of cross drives is equal to the number of hydraulic cylinders. Furthermore, the drive means may also comprise any convenient means to displace the elongated slats 97 such as an electronic motor.

Figure 13:
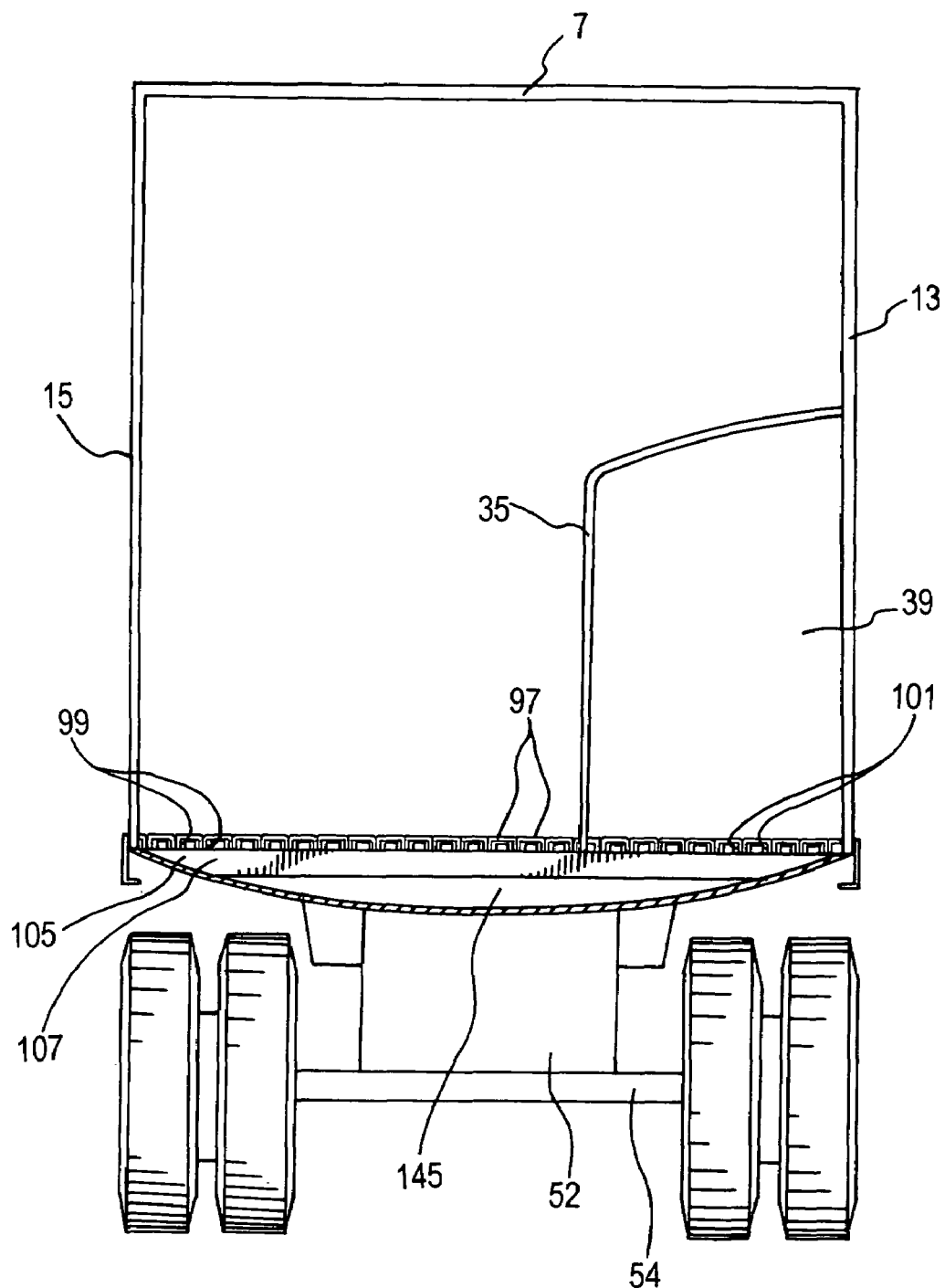
FIG. 13 is a rear plan view of a further embodiment of the waste collection container attached to a vehicle with an extended tray for collecting liquid waste.

As shown in FIG. 13, the reciprocating conveyor 95 may service one or more compartments of the container 5. The compartments of the container 5 that are serviced by the conveyor 95 will not have rams or upright rams for expelling waste from such compartments.

In a further embodiment of the container shown in FIG. 13, the cross members 105 are attached to a collecting tray 145. The collecting tray 145 is situated beneath the floor 9. In a preferred embodiment of the trailer, the collecting tray 145 extends beneath the floor 9 along most of the length of the floor 9. The collecting tray 145 attaches to the cross members 105 near the side wall 13 and the side wall 15. Though the collecting tray 145 may have any shape, it is preferred that it be arcuate in cross-section. In relation to the floor 9 above the extended tray 145, the collecting tray 145 is convex-shaped in cross-section. The collecting tray 145 is also preferably progressively sloped, either downward or upward, from the end of the collecting tray 145 proximate to the front wall 11 to the end of the collecting tray 145 proximate to the tailgate assembly 17. The collecting tray 145 is preferably sealed.

The collecting tray 145 forms a structural component of the container 5 since the collecting tray 145 supports the frame 107. It is preferred that the tray 145 be a single integral component. However, the collecting tray 145 may comprise multiple sections fastened together and sealed.

Figure 14:
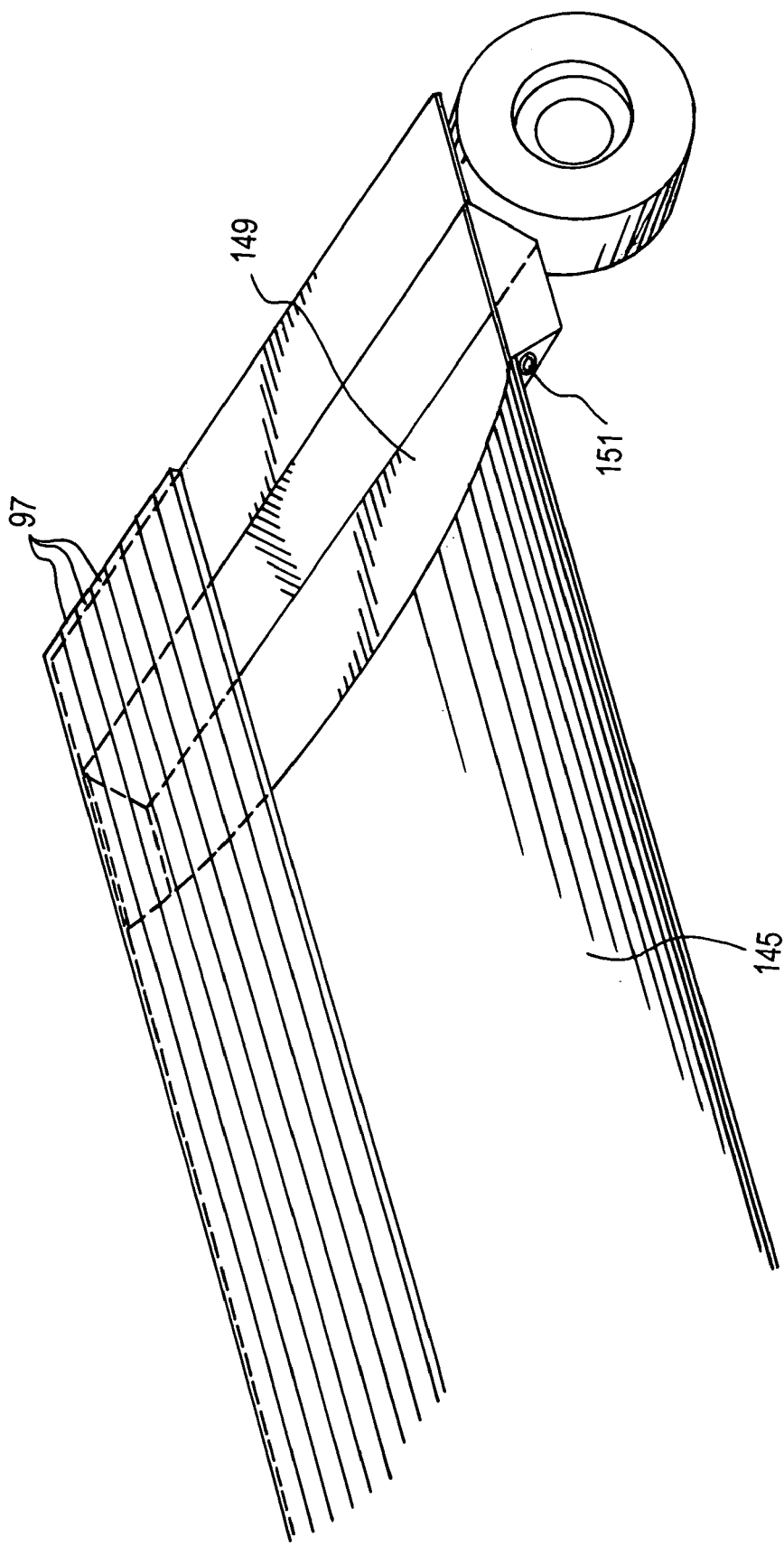
FIG. 14 is a perspective view of a further embodiment of the waste collection container with a transverse tray attached to the extended tray.

An alternative embodiment of the trailer 10, shown in FIG. 14, has a transverse tray 149 which is in communication with the collecting extended tray 145. Preferably, the transverse tray 149 also spans the width of the container 5 but is deeper than the collecting tray 145 since its floor is lower than that of collecting tray 145. Preferably, the transverse tray 149 is positioned near the drive means 115 but may be positioned anywhere along the length of the extended tray 145. The transverse tray 149 is equipped with a plug 151 to drain the transverse tray 149.

Figure 15:
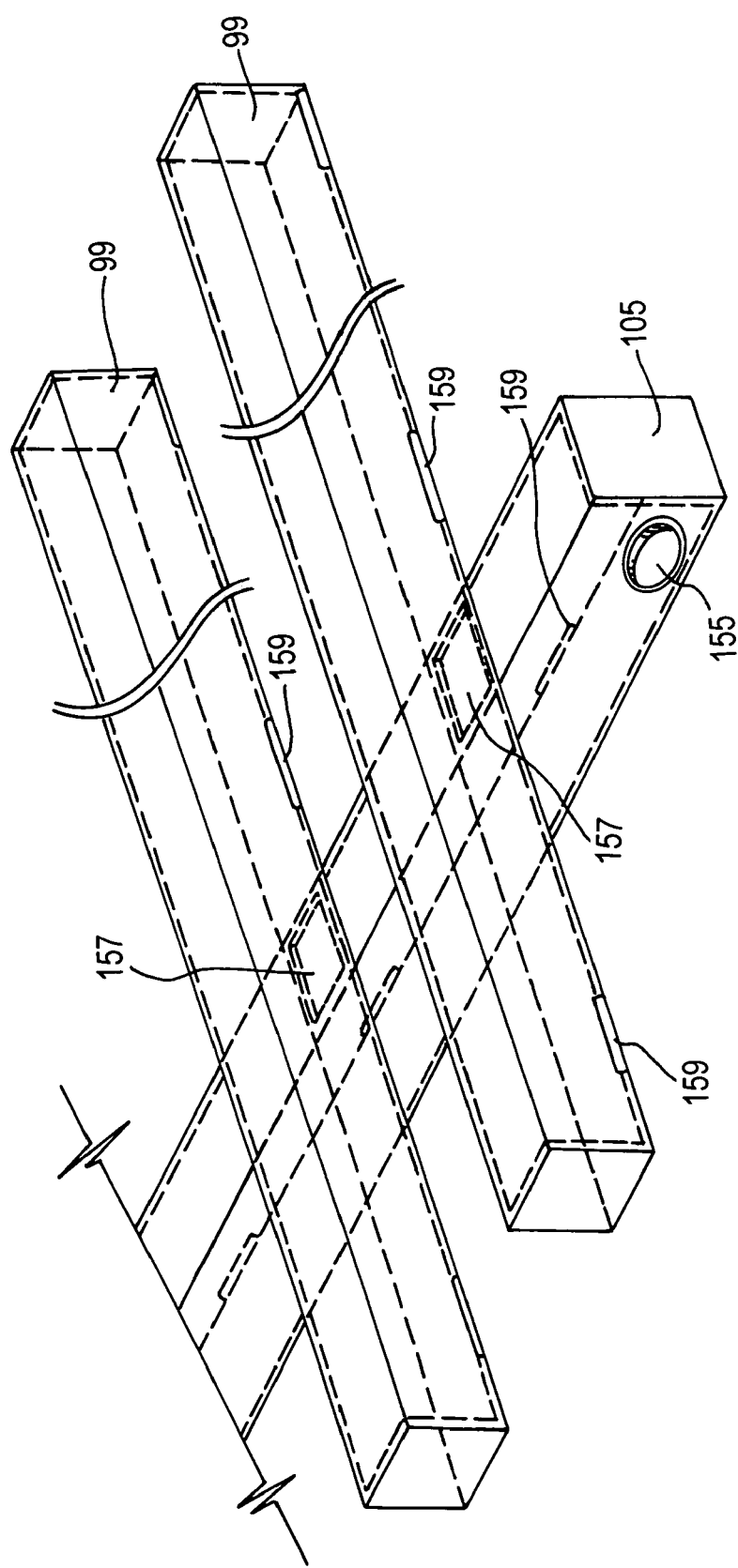
FIG. 15 is a perspective view of a cross member and two slats.

In a further embodiment of the container 5, shown in FIG. 15, the cross member 105 has a first aperture 155 and a series of second apertures 157 by which the cross member 105 is in communication with the lengthwise members 99. Both the cross member 105 and the lengthwise members 99 have slits 159.

Thus one or both compartments of the container 5 may be emptied by reciprocating conveyors. The operation of the conveyor will be explained with reference to a reciprocating conveyor used to expel waste from the secondary compartment 39. Wet refuse is deposited upon the floor 9 of the secondary compartment 39. Liquid from the refuse seeps between the elongated slats 97 and into the channel 29 after which it collects in the sump 31. In the alternative embodiment with the collecting tray 145, the liquid collects in the collecting tray 145. The liquid may also collect in the transverse tray 149 in the embodiment of the container 5 with an collecting tray 145 and a transverse tray 149.

Once the refuse has been collected and transported to its destination, the drive means 115 is engaged. The hydraulic cylinders 121, 123 and 125 extend and retract so as to move the transversely-mounted drive bars 131, 133 and 135 and thus displace the elongated slats 97 upon the bearings 101 on the lengthwise members 99. The hydraulic cylinders 121, 123 and 125 may extend in tandem so as to move all of the elongated slats 26 at once between a first and a second position and thus displace refuse. Alternatively, the hydraulic cylinders 121, 123 and 125 may extend and retract sequentially so as to return the elongated slats to the first or the second position at different times and thereby not displace the refuse.

Finally, in the alternative embodiment in which the cross member 105 and the lengthwise members 99 have first aperture 155 and second apertures 157, respectively, water or a suitable cleaning fluid is sprayed through the first aperture 155 into the cross member 105. The water or cleaning fluid then flows into the lengthwise members 99 through the second apertures 157. The water or cleaning fluid flows through the slits 159 in the cross member 105 and in the lengthwise members 99 and is thus dispersed throughout the extended tray 145 so that the extended tray 145 is easily cleaned.

Numerous modifications may be made to the embodiments as described above without departing from the scope of the invention, which is defined by the claims.

What is claimed is:

1. A refuse collection system for mounting to a vehicle, comprising:
    a refuse storage container divided into multiple internal compartments for receiving separate waste streams, each of said internal compartments having an opening to receive refuse;
    a refuse-receiving trough having an opening into which a user may deposit refuse, said trough divided internally by at least one generally vertical barrier into a plurality of adjacent trough-shaped receptacles each communicating with a corresponding internal compartment, said trough having a floor and a front wall dividing said trough from said storage container, said front wall having an upper edge at the openings of said internal compartments;
    a packer to displace refuse from said receptacles into said internal compartments, said packer comprising a unitary upper blade substantially spanning the width of said trough and a plurality of lower blades independently hinged to said upper blade, each lower blade corresponding to one of said receptacles for scooping refuse from its respective receptacle upon rotation of said lower blade; and
    an actuation system comprising a plurality of actuators for independently rotating said lower blades to scoop refuse from said receptacle for elevation to the upper edge of said rear wall, and at least one actuator for driving said upper blade and said lower blades in a reciprocating movement for packing said refuse into said storage container.

2. A system as defined in claim 1 mounted to the chassis of a vehicle.

3. A system as defined in claim 1, wherein said waste-receiving trough comprises a tailgate assembly mounted to the rear of said storage container and said packer is mounted to move in a fore and aft direction.

4. A system as defined in claim 1 further comprising at least one linkage arm pivotably attached at a first end to one of said lower blades and pivotably attached at a second end to said trough so as to guide the movement of said lower blades.

5. A system as defined in claim 1 further comprising dual walls between each of said receptacles wherein each set of said dual walls are spaced so as to define a slot.

6. A system as defined in claim 5 further comprising at least one movable divider wherein the width of said movable divider is less than the width of the slot defined by the dual walls such that said movable divider can fit within said slot.

7. A system according to claim 1, further comprising a tunnel-like internal compartment having a ceiling such that the height of the tunnel-like internal compartment is lower than the height of the at least one other internal compartment.

8. A system as defined in claim 7 mounted to the chassis of a vehicle.

9. A system as defined in claim 7 wherein the tunnel-like internal compartment is defined by a side wall of the refuse storage container, a floor of the refuse storage container, a divider between the tunnel-like internal compartment and the adjacent internal compartment and the ceiling.

10. A system as defined in claim 9 wherein the divider is removable.

11. A system a defined in claim 7 wherein at least one of said internal compartments is in communication with a container for storing liquid waste.

12. A system as defined in claim 11 wherein the container is a sump.

13. A system as defined in claim 11 wherein the container is a collecting tray situated beneath said refuse storage container wherein said collecting tray has a length and a width substantially equal to the length and the width of said storage container.

14. A system as defined in claim 13 further comprising a transverse tray in communication with said collecting tray wherein a floor of said transverse tray is below a floor of said collecting tray.

15. A system as defined in claim 14 further comprising a frame to support the refuse storage container wherein said frame is comprised of at least one cross member and at least two lengthwise members situated substantially perpendicularly to said cross member.

16. A system as defined in claim 15 wherein the at least one cross member has a first aperture for receiving a spray of liquid and further has a series of second apertures by which the cross member is in communication with the at least two lengthwise members.

17. A system as defined in claim 16 wherein the at least one cross member and the at least two lengthwise members have slits for distributing into the collection tray the liquid sprayed through the first aperture.

18. A system as defined in claim 7 further comprising a reciprocating conveyor to displace refuse from at least one of the internal compartments outside of the system.

* * * * *